United States Patent [19]
Fujii

[11] Patent Number: 4,623,226
[45] Date of Patent: Nov. 18, 1986

[54] COMPACT ZOOM LENS SYSTEM HAVING THREE LENS GROUPS

[75] Inventor: Tooru Fujii, Hino, Japan

[73] Assignee: Olympus Optical Co., Ltd., Tokyo, Japan

[21] Appl. No.: 446,402

[22] Filed: Dec. 2, 1982

[30] Foreign Application Priority Data

Dec. 8, 1981 [JP] Japan ............................ 56-196282

[51] Int. Cl.⁴ ...................... G02B 15/163; G02B 15/14
[52] U.S. Cl. ..................................... 350/427; 350/423; 350/450
[58] Field of Search ................. 350/423, 427, 449, 450

[56] References Cited

U.S. PATENT DOCUMENTS

| | | | |
|---|---|---|---|
| 3,044,356 | 7/1962 | Cox et al. ............................ | 350/423 |
| 4,256,381 | 3/1981 | Kraitzer ............................ | 350/423 |
| 4,432,615 | 2/1984 | Ikemori ............................ | 350/449 |
| 4,466,708 | 8/1984 | Batansky ............................ | 350/427 |
| 4,478,496 | 10/1984 | Kato ............................ | 350/427 |

*Primary Examiner*—John K. Corbin
*Assistant Examiner*—Scott J. Sugarman
*Attorney, Agent, or Firm*—Cushman, Darby & Cushman

[57] ABSTRACT

A compact zoom lens system having excellent performance and comprising a first lens group having positive refractive power, a second lens group having negative refractive power and a third lens group having positive refractive power, said third lens group being fixed relative to the image plane, said second lens group being moved along the optical axis for varying magnification, and deviation of the image position caused by moving said second lens group is compensated by moving said first lens group.

9 Claims, 9 Drawing Figures

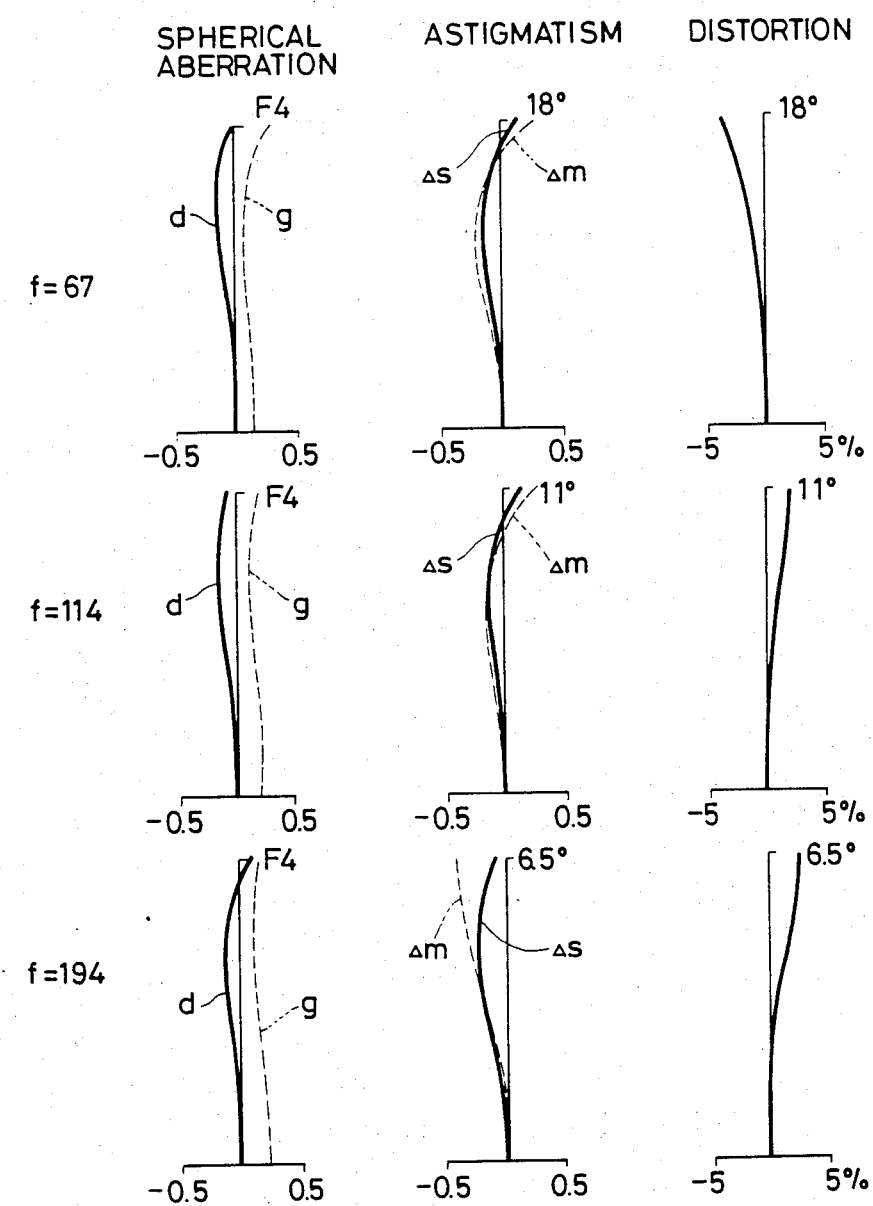

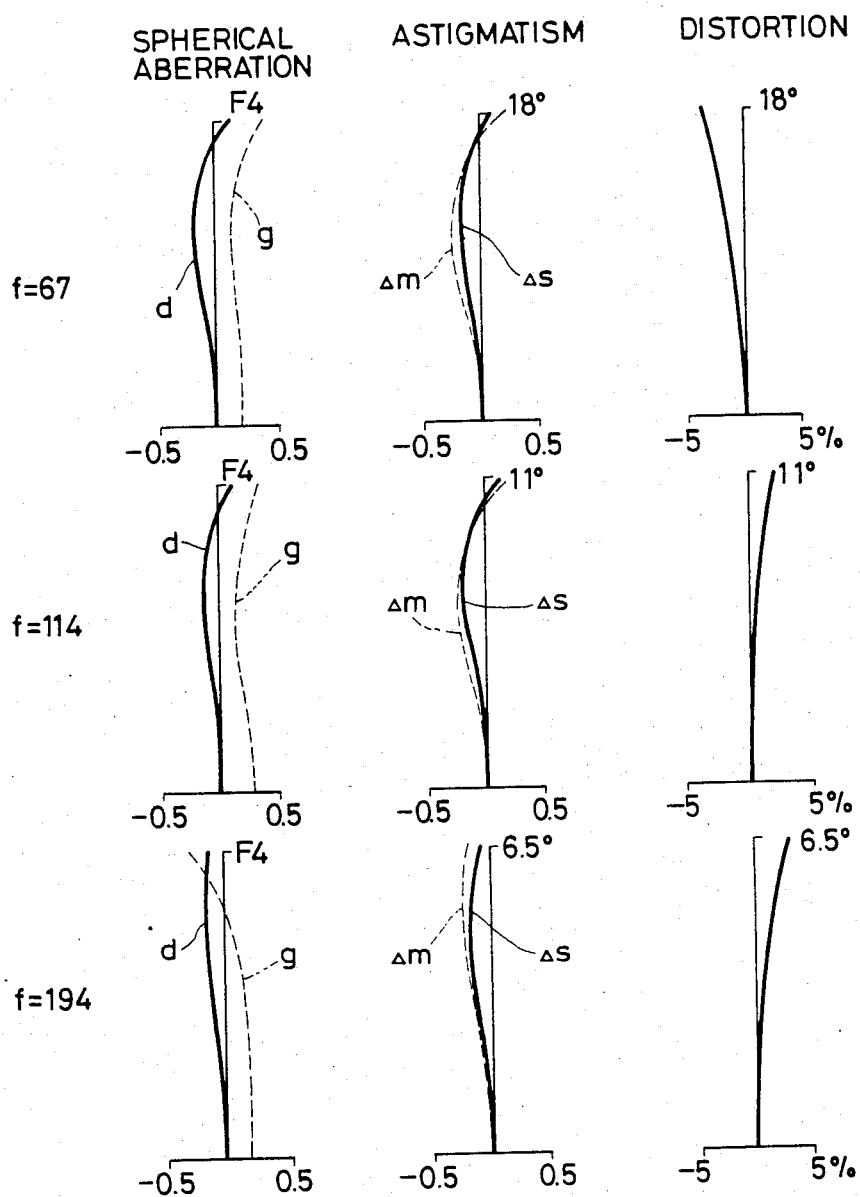

4,623,226

COMPACT ZOOM LENS SYSTEM HAVING THREE LENS GROUPS

BACKGROUND OF THE INVENTION (a) Field of the Invention

The present invention relates to a zoom lens system comprising three lens groups.

(b) Description of the Prior Art

There have generally been known zoom lens systems which comprise two, three and four lens groups. Out of these zoom lens systems, those comprising two and three lens groups are designed relatively compact but have drawbacks that they cannot provide sufficient performance, for example, so high zooming ratios. The zoom lens system comprising four lens groups have, in contrast, excellent performance, i.e., relatively high zooming ratios, and favorably corrected aberrations, are disadvantageous in that they cannot be designed compact.

Among the zoom lens systems comprising four lens groups, the afocal type zoom lens system is known most widely to those skilled in the art. In order to design this type of zoom lens system compact, it has hitherto practised to design its relay lens group compact, for example, by reducing number of the relay lens components. Patents have been applied for zoom lens systems comprising compactly designed relay lens system. These zoom lens systems have favorable performance as the merit of the relatively compact afocal type of zoom lens system, but are still insufficient in their compactness.

FIG. 1 shows the basic composition of the conventional afocal type of zoom lens system comprising four lens groups. As is seen from this drawing, the afocal type of zoom lens system comprising four lens groups is composed of a first lens group I designed as the focusing lens group which is kept fixed even at the time of zooming, a second lens group II designed as the veriator which has negative refractive power and is moved along the optical axis at the time of zooming, a third lens group III designed as so-called compensator which is moved along the optical axis to compensate deviation of the image position caused by moving the second lens group II, and a fourth lens group IV designed as the relay lens group having positive refractive power. That is to say, this type of zoom lens system is so designed as to perform zooming by moving said second and third lens groups.

SUMMARY OF THE INVENTION

A general object of the present invention is to provide a zoom lens system comprising three lens groups which is designed compact and has performance equalled to that of the conventional zoom lens system comprising four lens groups, and in which a first lens group designed as a compensator is moved along the optical axis for zooming thereby making said third lens group kept fixed as if the conventional third lens group were integrated with the conventional (relay lens group).

In the conventional zoom lens system comprising four lens groups, a wide airspace reserved between the third and fourth lens groups III and IV at the wide position W and tele position T as shown in FIG. 1 hindered total length of the lens system from being shorted. Since the rays between said third and fourth lens groups are afocal, it is possible to bring the third lens group near said fourth lens group at least at the wide position W and the tele position T.

The zoom lens system according to the present invention has such a basic composition as shown in FIG. 2. Speaking concretely, the zoom lens system according to the present invention comprises a first lens group I having positive refractive power, a second lens group II having negative refractive power and a third lens group III' consisting of the conventional third and fourth lens groups III and IV. Said second lens group II is moved as a variator as shown in FIG. 2 for varying magnification and deviation of the image position caused at that time is compensated by moving said first lens group I as shown in the drawing.

Since the zoom lens system according to the present invention has the basic composition and adopts lens group moving system as described above, it has a short total length at both or either of the wide position W and tele position T. In addition, the lens system according to the present invention has excellent performance since it is designed on the basis of the principle of four lens groups.

Furthermore, though FIG. 2 shows afocal rays between the third and fourth lens groups, they need not be afocal. Therefore, the present invention assures higher designing flexibility and permits designing a zoom lens system having higher performance. Moreover, the present invention makes it possible to design a compact zoom lens system since it allows to design the third lens group III' as a single lens group consisting of the third and fourth lens groups used in the conventional zoom lens system comprising four lens groups.

In the conventional zoom lens system comprising four lens groups, the third and fourth lens groups were designed as achromats independently. Accordingly, the third lens group was generally designed as a cemented doublet consisting of a positive element and a negative element.

In the zoom lens system according to the present invention, the third and fourth lens groups are integrated into a single lens group III' which can be designed as a single achromat, thereby making it possible to correct chromatic aberration favorably with a small number of lens elements. When an aperture stop is fixed on the front side of the third lens group III' or in the vicinity thereof (including inside the third lens group), the entrance pupil is located far from the first lens group and the front lens element must have a large diameter. Therefore, it may be desirable to design the aperture stop so as to be movable. For example, the aperture stop S may be moved together with the first lens group as indicated in dashed line in FIG. 2. This means permits minimizing variation of the entrance pupil position relative to the first lens group and diameter of the front lens element.

When the aperture stop is moved as described above, it cencels the merit of the conventional afocal type of zoom lens system comprising four lens groups, i.e., a constant F number with stop diameter kept constant. In other words, F number of the lens system is varied when the aperture stop is moved with its diameter kept constant for zooming. However, it is possible to keep F number constant by varying diameter of the aperture stop depending on its position.

BRIEF DESCRIPTION OF THE DRAWINGS

FIG. 6 through FIG. 9 show curves illustrating aberration characteristics of the Embodiments 1 through 4 of the present invention.

DETAILED DESCRIPTION OF THE PREFERRED EMBODIMENTS

Figure 1:
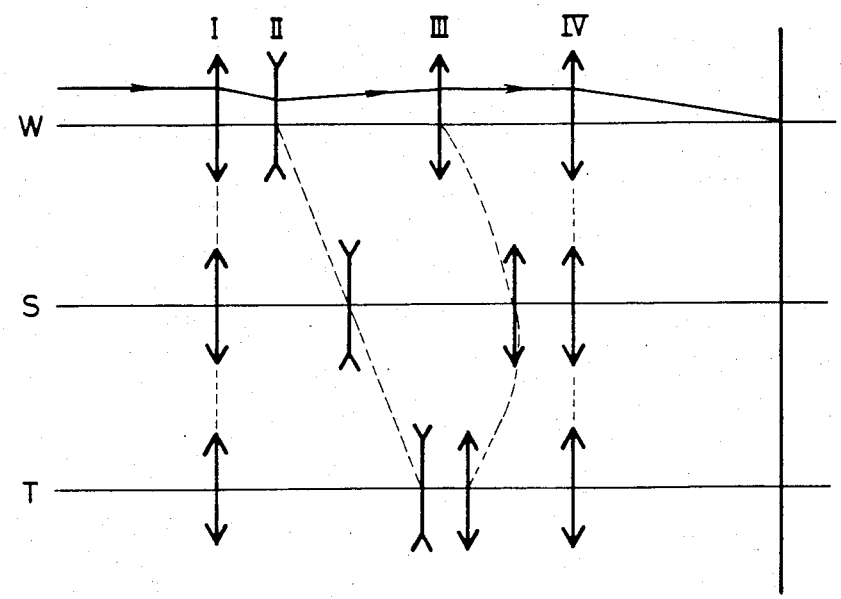
FIG. 1 shows a sectional view illustrating the basic composition of the conventional afocal type of zoom lens system comprising four lens groups.
Figure 2:
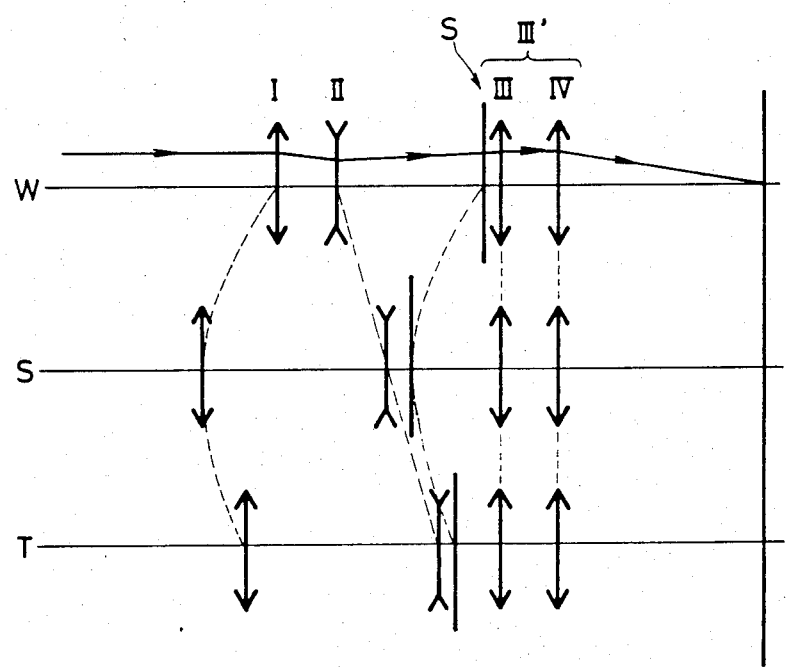
FIG. 2 shows a sectional view illustrating the basic composition of the zoom lens system according to the present invention.

The most desirable compositions and embodiments of the zoom lens system having the above-described basic composition will be set forth concretely below:

The first lens group I consists of a positive lens component, and a positive lens element and a negative lens element which as designed as a cemented doublet or arranged separately. The second lens group II consists of a negative lens component, and a negative lens element and a positive lens element which are designed as a cemented doublet or arranged separately. The third lens group III' consists of a front sub-group composed of a negative lens component and two positive lens components, and a rear sub-group composed of a negative meniscus lens component having a concave surface on the object side and a positive lens component.

Out of these lens groups, the first and second lens groups are similar to the first lens group and second lens group used in the conventional zoom lens system comprising four lens groups. The third lens group III' is designed compact by integrating the third and fourth lens groups of the conventional zoom lens system comprising four lens groups while reducing the number of the lens elements with their performance kept unchanged. Speaking more concretely, the third lens group III' is designed by integrating the third lens group (compensator) with the front sub-group of (generally has positive power as a whole and composed of two positive lens elements and a negative lens element) of the fourth lens group of the conventional zoom lens system comprising four lens groups. Since the first lens group is designed as a compensator in the zoom lens system according to the present invention as described above, it is unnecessary to make rays afocal on the front side of the relay lens group. Accordingly, the front subgroup of the third lens group III' (relay lens group) can comprise two lens components having positive refractive power. In addition, each of the two lens component need not be achromat so far as the front subgroup forms as an achromat. Therefore, the front lens subgroup can be composed sufficiently of two positive lens elements and a negative lens element. Further, this subgroup may be designed as the triplet type adapted in the ordinary type of photographic lens systems. The rear subgroup of the third lens group III' is composed of a single negative lens component similar to the rear subgroup of the fourth lens group (relay lens group) of the conventional zoom lens system comprising four lens groups, and a single positive lens component.

By designing the individual lens groups having the compositions described above, it is possible to obtain a compact zoom lens system comprising three lens groups which has performance equalled to that of the conventional afocal type of zoom lens system comprising four lens groups.

Now, preferred embodiments of the zoom lens system of the present invention will be described below:

Embodiment 1
f = 67~194, F 4

| | | | |
|---|---|---|---|
| $r_1 =$ | 331.09 | | |
| | $d_1 = 5$ | $n_1 = 1.48749$ | $v_1 = 70.2$ |
| $r_2 =$ | −155.08 | | |
| | $d_2 = 0.12$ | | |
| $r_3 =$ | 74.92 | | |
| | $d_3 = 7.2$ | $n_2 = 1.48749$ | $v_2 = 70.2$ |
| $r_4 =$ | −127.01 | | |
| | $d_4 = 2.45$ | $n_3 = 1.78472$ | $v_3 = 25.7$ |
| $r_5 =$ | −706.62 | | |
| | $d_5 = l_1$ | | |
| $r_6 =$ | 9262.44 | | |
| | $d_6 = 1.45$ | $n_4 = 1.8061$ | $v_4 = 41$ |
| $r_7 =$ | 38.03 | | |
| | $d_7 = 4$ | | |
| $r_8 =$ | −41.65 | | |
| | $d_8 = 1.45$ | $n_5 = 1.72$ | $v_5 = 46$ |
| $r_9 =$ | 38.76 | | |
| | $d_9 = 3.7$ | $n_6 = 1.84666$ | $v_6 = 23.9$ |
| $r_{10} =$ | −158.75 | | |
| | $d_{10} = l_{21}$ | | |
| $r'_{10} =$ | ∞ (stop) | | |
| | $d'_{10} = l_{22}$ | | |
| $r_{11} =$ | 47.95 | | |
| | $d_{11} = 4.2$ | $n_7 = 1.617$ | $v_7 = 62.8$ |
| $r_{12} =$ | −92.26 | | |
| | $d_{12} = 0.44$ | | |
| $r_{13} =$ | 40.905 | | |
| | $d_{13} = 5.08$ | $n_8 = 1.6228$ | $v_8 = 57.1$ |
| $r_{14} =$ | 144.573 | | |
| | $d_{14} = 1.58$ | | |
| $r_{15} =$ | −105.17 | | |
| | $d_{15} = 3.32$ | $n_9 = 1.92286$ | $v_9 = 21.3$ |
| $r_{16} =$ | 294.51 | | |
| | $d_{16} = 49.462$ | | |
| $r_{17} =$ | −18.59 | | |
| | $d_{17} = 2.5$ | $n_{10} = 1.8061$ | $v_{10} = 41$ |
| $r_{18} =$ | −36.39 | | |
| | $d_{18} = 0.15$ | | |
| $r_{19} =$ | 115.91 | | |
| | $d_{19} = 5$ | $n_{11} = 1.58267$ | $v_{11} = 46.3$ |
| $r_{20} =$ | −48.38 | | |

| f | $l_1$ | $l_{21}$ | $l_{22}$ |
|---|---|---|---|
| 67 | 1.943 | 39.245 | 1.19 |
| 114 | 25.47 | 15.718 | 10.896 |
| 194 | 39.29 | 1.898 | 1.19 |

$L_{min} = 178.1$, $L_{max} = 187.8$,
$f_1 = 101$, $f_2 = -33.5$, $f_3 = 52.17$

Embodiment 2
f = 67~194, F 4

| | | | |
|---|---|---|---|
| $r_1 =$ | 331.205 | | |
| | $d_1 = 5$ | $n_1 = 1.48749$ | $v_1 = 70.2$ |
| $r_2 =$ | −152.983 | | |
| | $d_2 = 0.12$ | | |
| $r_3 =$ | 74.861 | | |
| | $d_3 = 7.2$ | $n_2 = 1.48749$ | $v_2 = 70.2$ |
| $r_4 =$ | −126.858 | | |
| | $d_4 = 2.45$ | $n_3 = 1.78472$ | $v_3 = 25.7$ |
| $r_5 =$ | −738.749 | | |
| | $d_5 = l_1$ | | |
| $r_6 =$ | 838.724 | | |
| | $d_6 = 1.45$ | $n_4 = 1.8061$ | $v_4 = 41$ |
| $r_7 =$ | 37.634 | | |
| | $d_7 = 4$ | | |
| $r_8 =$ | −39.900 | | |

-continued

|  |  |  |  |
|---|---|---|---|
|  | $d_8 = 1.45$ | $n_5 = 1.72$ | $\nu_5 = 46$ |
| $r_9 =$ | 39.504 | | |
|  | $d_9 = 3.7$ | $n_6 = 1.84666$ | $\nu_6 = 23.9$ |
| $r_{10} =$ | $-154.122$ | | |
|  | $d_{10} = l_2$ | | |
| $r_{11} =$ | 48.32 | | |
|  | $d_{11} = 4.2$ | $n_7 = 1.617$ | $\nu_7 = 62.8$ |
| $r_{12} =$ | $-98.09$ | | |
|  | $d_{12} = 0.44$ | | |
| $r_{13} =$ | 41.795 | | |
|  | $d_{13} = 5.08$ | $n_8 = 1.6228$ | $\nu_8 = 57.1$ |
| $r_{14} =$ | 174.102 | | |
|  | $d_{14} = 1.58$ | | |
| $r_{15} =$ | $-107.717$ | | |
|  | $d_{15} = 3.32$ | $n_9 = 1.92286$ | $\nu_9 = 21.3$ |
| $r_{16} =$ | 314.89 | | |
|  | $d_{16} = 48.93$ | | |
| $r_{17} =$ | $-18.624$ | | |
|  | $d_{17} = 2.5$ | $n_{10} = 1.8061$ | $\nu_{10} = 41$ |
| $r_{18} =$ | $-36.97$ | | |
|  | $d_{18} = 0.15$ | | |
| $r_{19} =$ | 117.017 | | |
|  | $d_{19} = 5$ | $n_{11} = 1.58267$ | $\nu_{11} = 46.3$ |
| $r_{20} =$ | $-48.869$ | | |

| f | $l_1$ | $l_2$ |
|---|---|---|
| 67 | 1.8162 | 40.534 |
| 114 | 25.343 | 26.713 |
| 194 | 39.163 | 3.187 |

$L_{min} = 138.92$, $L_{max} = 148.626$
$f_1 = 101$, $f_2 = -33.5$, $f_3 = 56$

Embodiment 3
$f = 67 \sim 194$, F 4

|  |  |  |  |
|---|---|---|---|
| $r_1 =$ | 521.929 | | |
|  | $d_1 = 4.6$ | $n_1 = 1.48749$ | $\nu_1 = 70.2$ |
| $r_2 =$ | $-148.682$ | | |
|  | $d_2 = 0.12$ | | |
| $r_3 =$ | 74.46 | | |
|  | $d_3 = 6.7$ | $n_2 = 1.48749$ | $\nu_2 = 70.2$ |
| $r_4 =$ | $-142.408$ | | |
|  | $d_4 = 2.45$ | $n_3 = 1.78472$ | $\nu_3 = 25.7$ |
| $r_5 =$ | $-1072.34$ | | |
|  | $d_5 = l_1$ | | |
| $r_6 =$ | $-1038.913$ | | |
|  | $d_6 = 4.2$ | $n_4 = 1.78472$ | $\nu_4 = 25.7$ |
| $r_7 =$ | $-46.05$ | | |
|  | $d_7 = 1.44$ | $n_5 = 1.50378$ | $\nu_5 = 66.8$ |
| $r_8 =$ | 37.918 | | |
|  | $d_8 = 4.98$ | | |
| $r_9 =$ | $-37.452$ | | |
|  | $d_9 = 1.44$ | $n_6 = 1.7432$ | $\nu_6 = 49.3$ |
| $r_{10} =$ | 558.858 | | |
|  | $d_{10} = l_2$ | | |
| $r_{11} =$ | 75.737 | | |
|  | $d_{11} = 4.3$ | $n_7 = 1.617$ | $\nu_7 = 62.8$ |
| $r_{12} =$ | $-39.819$ | | |
|  | $d_{12} = 2.4$ | | |
| $r_{13} =$ | $-35.412$ | | |
|  | $d_{13} = 2$ | $n_8 = 1.78472$ | $\nu_8 = 25.7$ |
| $r_{14} =$ | $-88.372$ | | |
|  | $d_{14} = 0.5$ | | |
| $r_{15} =$ | 48.024 | | |
|  | $d_{15} = 4.98$ | $n_9 = 1.6779$ | $\nu_9 = 55.3$ |
| $r_{16} =$ | 119.043 | | |
|  | $d_{16} = 60.027$ | | |
| $r_{17} =$ | $-22.124$ | | |
|  | $d_{17} = 2.21$ | $n_{10} = 1.744$ | $\nu_{10} = 44.7$ |
| $r_{18} =$ | $-30.941$ | | |
|  | $d_{18} = 0.15$ | | |
| $r_{19} =$ | 63.309 | | |
|  | $d_{19} = 6.4$ | $n_{11} = 1.62012$ | $\nu_{11} = 49.7$ |
| $r_{20} =$ | $-394.827$ | | |

| f | $l_1$ | $l_2$ |
|---|---|---|
| 67 | 1.7124 | 39.996 |
| 114 | 25.239 | 26.175 |
| 194 | 39.059 | 2.649 |

$L_{min} = 150.605$, $L_{max} = 160.311$
$f_1 = 106$, $f_2 = -33.5$, $f_3 = 56$

Embodiment 4

-continued
$f = 67 \sim 194$, F 4

|  |  |  |  |
|---|---|---|---|
| $r_1 =$ | 99.76 | | |
|  | $d_1 = 6.5$ | $n_1 = 1.48749$ | $\nu_1 = 70.2$ |
| $r_2 =$ | $-172.313$ | | |
|  | $d_2 = 0.12$ | | |
| $r_3 =$ | 109.056 | | |
|  | $d_3 = 7.5$ | $n_2 = 1.50048$ | $\nu_2 = 66$ |
| $r_4 =$ | $-111.769$ | | |
|  | $d_4 = 2$ | $n_3 = 1.7495$ | $\nu_3 = 35.3$ |
| $r_5 =$ | 483.543 | | |
|  | $d_5 = l_1$ | | |
| $r_6 =$ | $-844.744$ | | |
|  | $d_6 = 5$ | $n_4 = 1.78472$ | $\nu_4 = 25.7$ |
| $r_7 =$ | $-41.023$ | | |
|  | $d_7 = 1.5$ | $n_5 = 1.5263$ | $\nu_5 = 51.2$ |
| $r_8 =$ | 36.139 | | |
|  | $d_8 = 5.2$ | | |
| $r_9 =$ | $-31.94$ | | |
|  | $d_9 = 1.5$ | $n_6 = 1.58904$ | $\nu_6 = 53.2$ |
| $r_{10} =$ | 3814.64 | | |
|  | $d_{10} = l_2$ | | |
| $r_{11} =$ | 52.326 | | |
|  | $d_{11} = 5.5$ | $n_7 = 1.61117$ | $\nu_7 = 55.9$ |
| $r_{12} =$ | $-37.502$ | | |
|  | $d_{12} = 2.4$ | | |
| $r_{13} =$ | $-32.724$ | | |
|  | $d_{13} = 2$ | $n_8 = 1.78472$ | $\nu_8 = 25.7$ |
| $r_{14} =$ | $-110.328$ | | |
|  | $d_{14} = 0.37$ | | |
| $r_{15} =$ | 47.639 | | |
|  | $d_{15} = 4.98$ | $n_9 = 1.5263$ | $\nu_9 = 51.2$ |
| $r_{16} =$ | 154.948 | | |
|  | $d_{16} = 53.84$ | | |
| $r_{17} =$ | $-20.709$ | | |
|  | $d_{17} = 2.21$ | $n_{10} = 1.757$ | $\nu_{10} = 47.9$ |
| $r_{18} =$ | $-27.67$ | | |
|  | $d_{18} = 0.15$ | | |
| $r_{19} =$ | 59.052 | | |
|  | $d_{19} = 5.5$ | $n_{11} = 1.62374$ | $\nu_{11} = 47.1$ |
| $r_{20} =$ | $-2279.574$ | | |

| f | $l_1$ | $l_2$ |
|---|---|---|
| 67 | 2.28 | 40.93 |
| 114 | 26.86 | 26.49 |
| 194 | 41.299 | 1.912 |

$L_{min} = 149.48$, $L_{max} = 159.62$
$f_1 = 115$, $f_2 = -35$, $f_3 = 56$ wherein the reference symbols $r_1$ through $r_{20}$ represent radii of curvature on the surfaces of the respective lens elements, the reference symbols $d_1$ through $d_{19}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbols $L_{min}$ and $L_{max}$ designate minimum and maximum lengths of the zoom lens system as a whole respectively, the reference symbol f denotes focal length of the zoom lens system as a whole, and the reference symbols $f_1$, $f_2$ and $f_3$ represent focal lengths of the first, second and third lens groups respectively.

Figure 3:
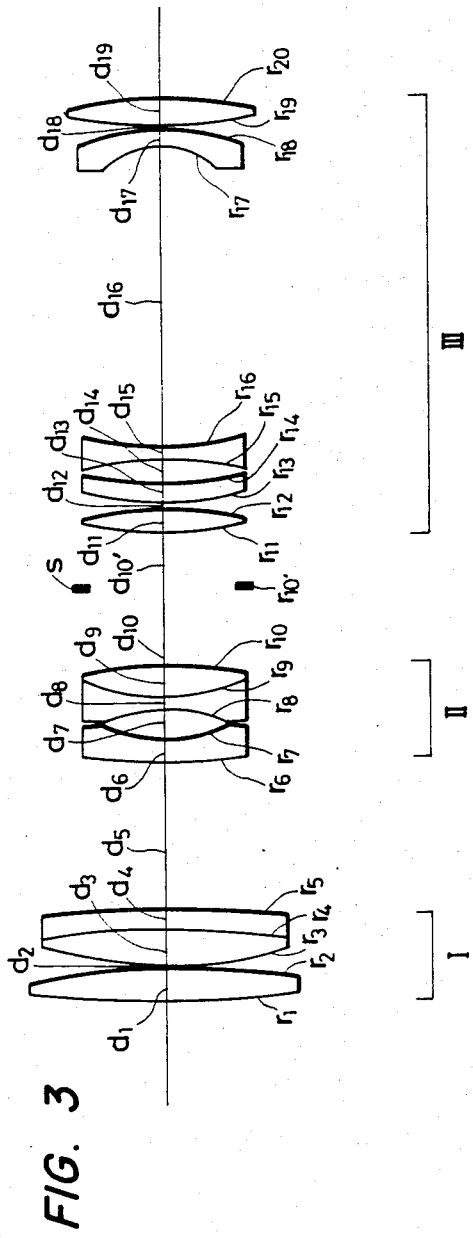
FIG. 3 shows a sectional view illustrating composition of Embodiment 1 of the zoom lens system according to the present invention.

Out of the embodiments of the present invention described above, the Embodiment 1 is a zoom lens system having the composition shown in FIG. 3. This embodiment is so designed as to move the stop S arranged on the front side of the third lens group together with the first lens group. This means makes it possible to minimize diameter of the front lens element and obtain a sufficient quantity of marginal rays even when a filter having a diameter of 55 mm, for example, is adopted. Variation of F number of Embodiment 1 caused by moving the stop can be prevented by gradually reducing diameter of the stop as it is moved frontward and increased as it is moved rearward.

Figure 4:
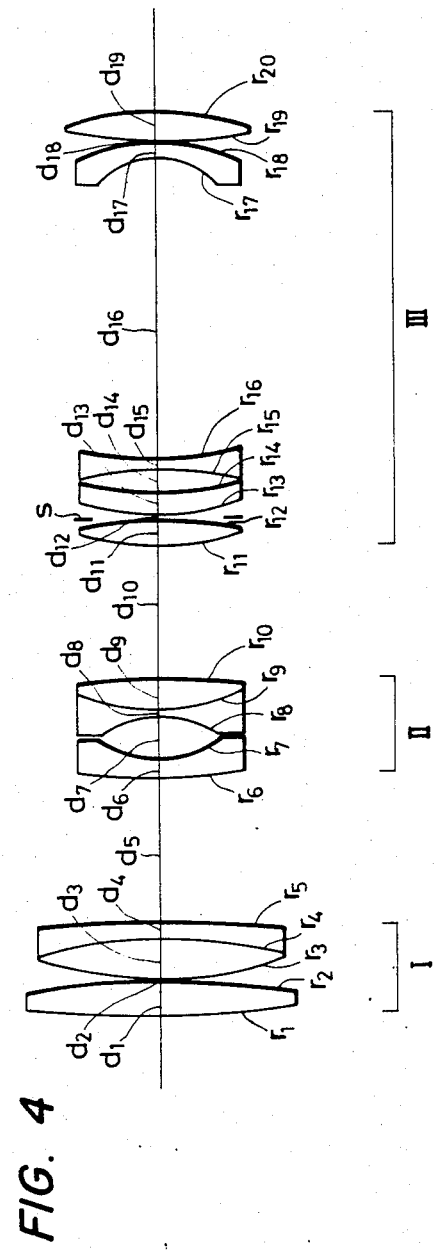
FIG. 4 shows a sectional view illustrating composition of Embodiment 2 of the zoom lens system according to the present invention.

The Embodiment 2 has the composition shown in FIG. 4 and comprises a stop which is fixed between the surfaces $r_{12}$ and $r_{13}$.

Figure 5:
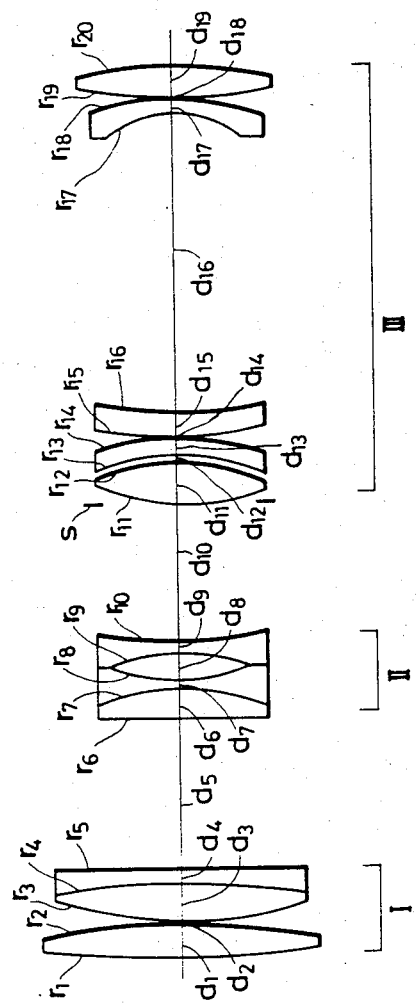
FIG. 5 shows a sectional view illustrating composition of Embodiments 3 and 4 of the zoom lens system according to the present invention.
Figure 6:
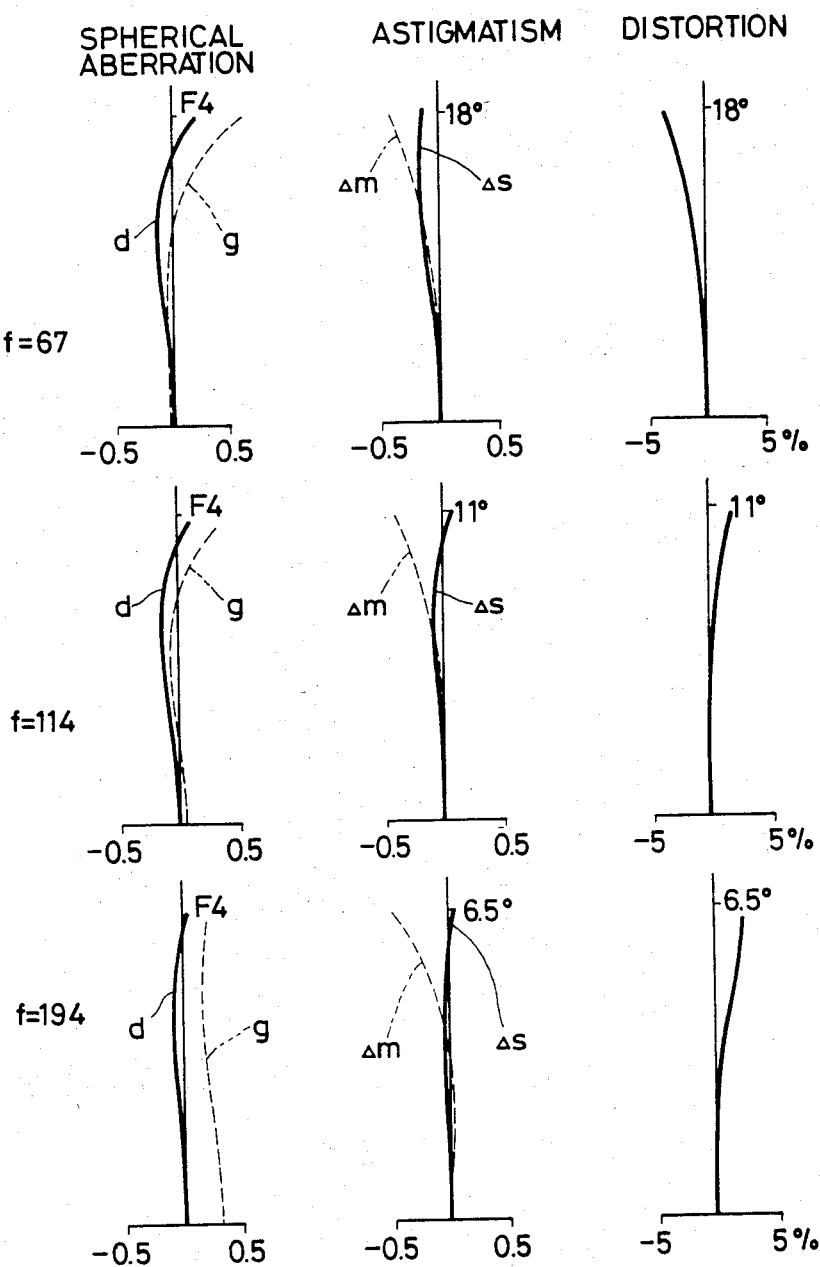
Figure 7:
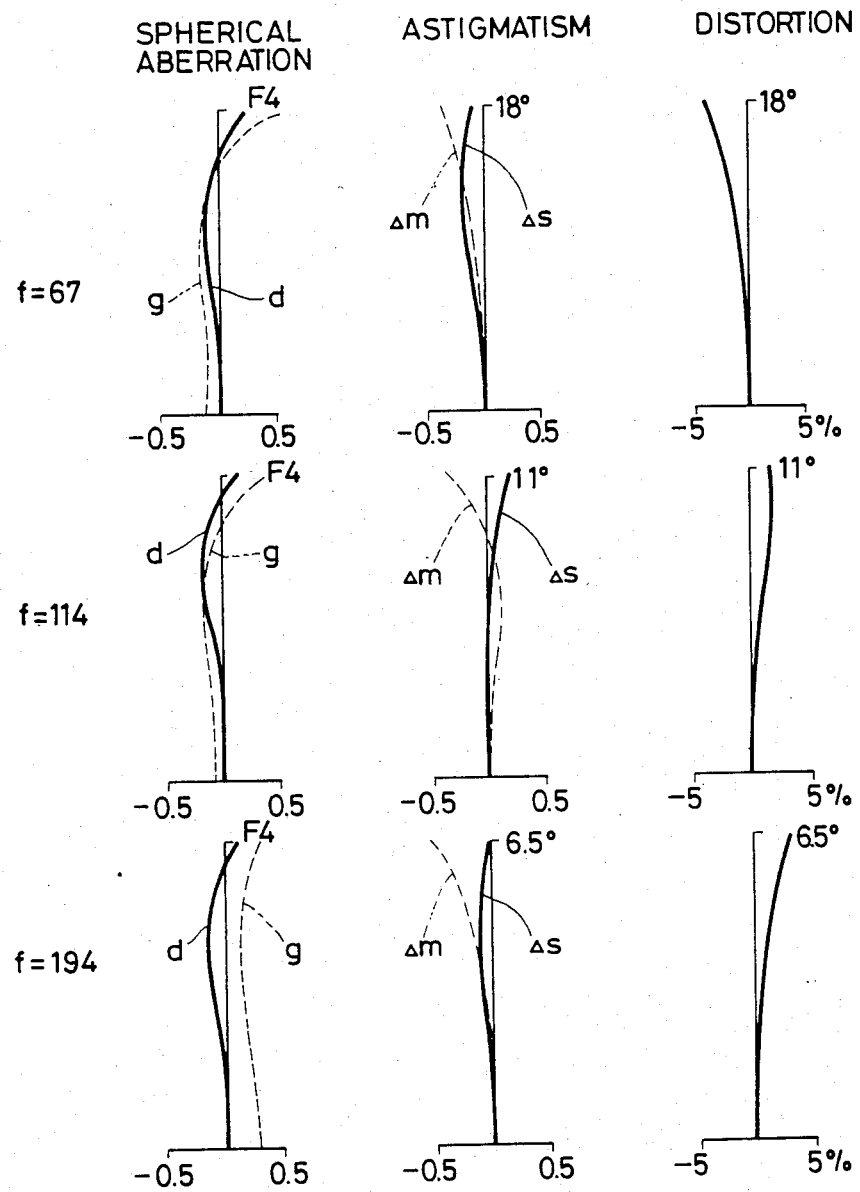

The Embodiments 3 and 4 are zoom lens systems both of which have the composition illustrated in FIG. 5. In these embodiments, the stop S is fixed just before the third lens group. Further, the front subgroup of the third lens group of these embodiments is designed as a triplet type.

As is understood from the foregoing descriptions and embodiments set forth above, the zoom lens system according to the present invention is compacter and has simpler composition consisting of a smaller number of lens elements than the conventional zoom lens system comprising four lens groups. The zoom lens system according to the present invention has a far shorter total length as a whole especially at the wide position and tele position. Irrespective of this merit, the zoom lens system according to the present invention still maintain the advantage of the conventional zoom lens system comprising four lens groups. In addition, as is seen from the curves illustrating the aberration characteristics of the individual embodiments, aberrations are corrected favorably in the zoom lens system according to the present invention in which the third lens group is not moved. As compared especially with the conventional zoom lens system comprising three lens groups, aberrations are corrected far favorably in the zoom lens system according to the present invention.

I claim:

1. A zoom lens system comprising a first lens group having positive refractive power, a second lens group having negative refractive power, a third lens group having positive refractive power, and an aperture stop arranged between said second lens group and said third lens group, said third lens group being fixed relative to the image plane, said second lens group being moved along the optical axis for varying focal length of the zoom lens system as a whole, deviation of the image position caused by moving said second lens group being compensated by moving said first lens group along the optical axis, and said aperture stop being moved together with said first lens group for minimizing reduction of the marginal rays.

2. A zoom lens system according to claim 1 so adapted as to maintain the aperture ratio of said zoom lens system as a whole at a substantially constant level by gradually reducing diameter of the stop as said aperture stop is moved frontward and gradually increasing diameter of the stop as said aperture stop is moved rearward.

3. A zoom lens system according to claim 2 comprising said first lens group consisting of a positive lens component and a cemented doublet composed of a positive element and a negative lens element, said second lens group consisting of a negative lens component and a cemented doublet composed of a negative lens element and a positive lens element, and said third lens group consisting of a front subgroup composed of two positive lens elements and a single negative lens element and a rear subgroup composed of a negative lens component and a positive lens component.

4. A zoom lens system according to claim 3 having the following numerical data:

| $f = 67 \sim 194, F\ 4$ | | | |
|---|---|---|---|
| $r_1 = 331.09$ | | | |
| | $d_1 = 5$ | $n_1 = 1.48749$ | $\nu_1 = 70.2$ |
| $r_2 = -155.08$ | | | |
| | $d_2 = 0.12$ | | |
| $r_3 = 74.92$ | | | |
| | $d_3 = 7.2$ | $n_2 = 1.48749$ | $\nu_2 = 70.2$ |
| $r_4 = -127.01$ | | | |
| | $d_4 = 2.45$ | $n_3 = 1.78472$ | $\nu_3 = 25.7$ |
| $r_5 = -706.62$ | | | |
| | $d_5 = l_1$ | | |
| $r_6 = 9262.44$ | | | |
| | $d_6 = 1.45$ | $n_4 = 1.8061$ | $\nu_4 = 41$ |
| $r_7 = 38.03$ | | | |
| | $d_7 = 4$ | | |
| $r_8 = -41.65$ | | | |
| | $d_8 = 1.45$ | $n_5 = 1.72$ | $\nu_5 = 46$ |
| $r_9 = 38.76$ | | | |
| | $d_9 = 3.7$ | $n_6 = 1.84666$ | $\nu_6 = 23.9$ |
| $r_{10} = -158.75$ | | | |
| | $d_{10} = l_{21}$ | | |
| $r'_{10} = \infty$ (stop) | | | |
| | $d'_{10} = l_{22}$ | | |
| $r_{11} = 47.95$ | | | |
| | $d_{11} = 4.2$ | $n_7 = 1.617$ | $\nu_7 = 62.8$ |
| $r_{12} = -92.26$ | | | |
| | $d_{12} = 0.44$ | | |
| $r_{13} = 40.905$ | | | |
| | $d_{13} = 5.08$ | $n_8 = 1.6228$ | $\nu_8 = 57.1$ |
| $r_{14} = 144.573$ | | | |
| | $d_{14} = 1.58$ | | |
| $r_{15} = -105.17$ | | | |
| | $d_{15} = 3.32$ | $n_9 = 1.92286$ | $\nu_9 = 21.3$ |
| $r_{16} = 294.51$ | | | |
| | $d_{16} = 49.462$ | | |
| $r_{17} = -18.59$ | | | |
| | $d_{17} = 2.5$ | $n_{10} = 1.8061$ | $\nu_{10} = 41$ |
| $r_{18} = -36.39$ | | | |
| | $d_{18} = 0.15$ | | |
| $r_{19} = 115.91$ | | | |
| | $d_{19} = 5$ | $n_{11} = 1.58267$ | $\nu_{11} = 46.3$ |
| $r_{20} = -48.38$ | | | |

| $f$ | $l_1$ | $l_{21}$ | $l_{22}$ |
|---|---|---|---|
| 67 | 1.943 | 39.245 | 1.19 |
| 114 | 25.47 | 15.718 | 10.896 |
| 194 | 39.29 | 1.898 | 1.19 |
| $L_{min} = 178.1$, $L_{max} = 187.8$, | | | |
| $f_1 = 101$, $f_2 = -33.5$, $f_3 = 52.17$ | | | | wherein the reference symbols $r_1$ through $r_{20}$ represent radii of curvature on the surfaces of the respective lens elements, the reference symbols $d_1$ through $d_{19}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbols $L_{min}$ and $L_{max}$ designate minimum and maximum total lengths respectively of the lens system as a whole, the reference symbol f denotes focal length of the lens system as a whole, and the reference symbols $f_1$, $f_2$ and $f_3$ represent focal lengths of said first, second and third lens groups respectively.

5. A zoom lens system according to claim 1 comprising said first lens group consisting a positive lens component and a cemented doublet composed of a positive element and a negative lens element, said second lens group consisting of a negative lens component and a cemented doublet composed of a negative lens element and a positive lens element, and said third lens group consisting of a front subgroup composed of two positive lens elements and a single negative lens element and a rear subgroup composed of a negative lens component and a positive lens component.

6. A zoom lens system according to claim 5 having the following numerical data:

| \multicolumn{5}{c}{$f = 67 \sim 194$, F 4} |
|---|---|---|---|---|
| $r_1 =$ | 331.09 | | | |
| | $d_1 = 5$ | | $n_1 = 1.48749$ | $v_1 = 70.2$ |
| $r_2 =$ | $-155.08$ | | | |
| | $d_2 = 0.12$ | | | |
| $r_3 =$ | 74.92 | | | |
| | $d_3 = 7.2$ | | $n_2 = 1.48749$ | $v_2 = 70.2$ |
| $r_4 =$ | $-127.01$ | | | |
| | $d_4 = 2.45$ | | $n_3 = 1.78472$ | $v_3 = 25.7$ |
| $r_5 =$ | $-706.62$ | | | |
| | $d_5 = l_1$ | | | |
| $r_6 =$ | 9262.44 | | | |
| | $d_6 = 1.45$ | | $n_4 = 1.8061$ | $v_4 = 41$ |
| $r_7 =$ | 8.03 | | | |
| | $d_7 = 4$ | | | |
| $r_8 =$ | $-41.65$ | | | |
| | $d_8 = 1.45$ | | $n_5 = 1.72$ | $v_5 = 46$ |
| $r_9 =$ | 38.76 | | | |
| | $d_9 = 3.7$ | | $n_6 = 1.84666$ | $v_6 = 23.9$ |
| $r_{10} =$ | $-158.75$ | | | |
| | $d_{10} = l_{21}$ | | | |
| $r'_{10} =$ | $\infty$ (stop) | | | |
| | $d'_{10} = l_{22}$ | | | |
| $r_{11} =$ | 47.95 | | | |
| | $d_{11} = 4.2$ | | $n_7 = 1.617$ | $v_7 = 62.8$ |
| $r_{12} =$ | $-92.26$ | | | |
| | $d_{12} = 0.44$ | | | |
| $r_{13} =$ | 40.905 | | | |
| | $d_{13} = 5.08$ | | $n_8 = 1.6228$ | $v_8 = 57.1$ |
| $r_{14} =$ | 144.573 | | | |
| | $d_{14} = 1.58$ | | | |
| $r_{15} =$ | $-105.17$ | | | |
| | $d_{15} = 3.32$ | | $n_9 = 1.92286$ | $v_9 = 21.3$ |
| $r_{16} =$ | 294.51 | | | |
| | $d_{16} = 49.462$ | | | |
| $r_{17} =$ | $-18.59$ | | | |
| | $d_{17} = 2.5$ | | $n_{10} = 1.8061$ | $v_{10} = 41$ |
| $r_{18} =$ | $-36.39$ | | | |
| | $d_{18} = 0.15$ | | | |
| $r_{19} =$ | 115.91 | | | |
| | $d_{19} = 5$ | | $n_{11} = 1.58267$ | $v_{11} = 46.3$ |
| $r_{20} =$ | $-48.38$ | | | |

| f | $l_1$ | $l_{21}$ | $l_{22}$ |
|---|---|---|---|
| 67 | 1.943 | 39.245 | 1.19 |
| 114 | 25.47 | 15.718 | 10.896 |
| 194 | 39.29 | 1.898 | 1.19 |

$L_{min} = 178.1$, $L_{max} = 187.8$,
$f_1 = 101$, $f_2 = -33.5$, $f_3 = 52.17$ wherein the reference symbols $r_1$ through $r_{20}$ represent radii of curvature on the surfaces of the respective lens elements, the reference symbols $d_1$ through $d_{19}$ designate thicknesses of the respective lens elements and airspaces reserved therebetween, the reference symbols $n_1$ through $n_{11}$ denote refractive indices of the respective lens elements, the reference symbols $v_1$ through $v_{11}$ represent Abbe's numbers of the respective lens elements, the reference symbols $L_{min}$ and $L_{max}$ designate minimum and maximum total lengths respectively of the lens system as a whole, the reference symbol f denotes focal length of the lens system as a whole, and the reference symbols $f_1$, $f_2$ and $f_3$ represent focal lengths of said first, second and third lens groups respectively.

7. A zoom lens system comprising a first lens group having positive power and consisting of a positive lens component and a cemented doublet composed of a positive lens element and a negative lens element, a second lens group having negative refractive power and consisting of a negative lens component and a cemented doublet composed of a negative lens element and a positive lens element, and a third lens group having positive refractive power and consisting of a positive lens component, another positive lens component, a negative lens component, another negative lens component, and a third positive lens component, said third lens group being fixed relative to the image plane, said second lens group being moved along the optical axis for varying focal length of the zoom lens system as a whole, and deviation of the image position caused by moving said second lens groups being compensated by moving said first lens group along the optical axis, said zoom lens system having the following numerical data:

| \multicolumn{5}{c}{$f = 67 \sim 194$, F 4} |
|---|---|---|---|---|
| $r_1 =$ | 331.205 | | | |
| | $d_1 = 5$ | | $n_1 = 1.48749$ | $v_1 = 70.2$ |
| $r_2 =$ | $-152.983$ | | | |
| | $d_2 = 0.12$ | | | |
| $r_3 =$ | 74.861 | | | |
| | $d_3 = 7.2$ | | $n_2 = 1.48749$ | $v_2 = 70.2$ |
| $r_4 =$ | $-126.858$ | | | |
| | $d_4 = 2.45$ | | $n_3 = 1.78472$ | $v_3 = 25.7$ |
| $r_5 =$ | $-738.749$ | | | |
| | $d_5 = l_1$ | | | |
| $r_6 =$ | 838.724 | | | |
| | $d_6 = 1.45$ | | $n_4 = 1.8061$ | $v_4 = 41$ |
| $r_7 =$ | 37.634 | | | |
| | $d_7 = 4$ | | | |
| $r_8 =$ | $-39.900$ | | | |
| | $d_8 = 1.45$ | | $n_5 = 1.72$ | $v_5 = 46$ |
| $r_9 =$ | 39.504 | | | |
| | $d_9 = 3.7$ | | $n_6 = 1.84666$ | $v_6 = 23.9$ |
| $r_{10} =$ | $-154.122$ | | | |
| | $d_{10} = l_2$ | | | |
| $r_{11} =$ | 48.32 | | | |
| | $d_{11} = 4.2$ | | $n_7 = 1.617$ | $v_7 = 62.8$ |
| $r_{12} =$ | $-98.09$ | | | |
| | $d_{12} = 0.44$ | | | |
| $r_{13} =$ | 41.795 | | | |
| | $d_{13} = 5.08$ | | $n_8 = 1.6228$ | $v_8 = 57.1$ |
| $r_{14} =$ | 174.102 | | | |
| | $d_{14} = 1.58$ | | | |
| $r_{15} =$ | $-107.717$ | | | |
| | $d_{15} = 3.32$ | | $n_9 = 1.92286$ | $v_9 = 21.3$ |
| $r_{16} =$ | 314.89 | | | |
| | $d_{16} = 48.93$ | | | |
| $r_{17} =$ | $-18.624$ | | | |
| | $d_{17} = 2.5$ | | $n_{10} = 1.8061$ | $v_{10} = 41$ |
| $r_{18} =$ | $-36.97$ | | | |
| | $d_{18} = 0.15$ | | | |
| $r_{19} =$ | 117.017 | | | |
| | $d_{19} = 5$ | | $n_{11} = 1.58267$ | $v_{11} = 46.3$ |
| $r_{20} =$ | $-48.869$ | | | |

| [$f_1$] f | $l_1$ | $l_2$ |
|---|---|---|
| 67 | 1.8162 | 40.534 |
| 114 | 25.343 | 26.713 |
| 194 | 39.163 | 3.187 |

$L_{min} = 138.92$, $L_{max} = 148.626$
$f_1 = 101$, $f_2 = -33.5$, $f_3 = 56$ wherein the reference symbols $r_1$ through $r_{20}$ represent radii of curvature on the surfaces of the respective lens elements, the reference symbols $d_1$ through $d_{19}$ designate thicknesses of the respective lens elements and airspaces reserved therebetween, the reference symbols $n_1$ through $n_{11}$ denote refractive indices of the respective lens elements, the reference symbols $v_1$ through $v_{11}$ represent Abbe's numbers of the respective lens elements, the reference symbols $L_{min}$ and $L_{max}$ designate minimum and maximum total lengths respectively of the lens system as a whole, the reference symbol f denotes focal length of the lens system as a whole, and the reference symbols $f_1$, $f_2$ and $f_3$ represent focal lengths of said first, second and third lens groups respectively.

8. A zoom lens system comprising a first lens group having positive power and consisting of a positive lens component and a cemented doublet composed of a positive lens element and a negative lens element, a second lens group having negative refractive power and consisting of a cemented doublet composed of a positive lens element and a negative lens element and a negative lens component, and a third lens group having positive refractive power and consisting of a positive lens component, a negative lens component, another positive lens component, another negative lens component, and a third positive lens component, said third lens groups being fixed relative to the image plane, said second lens group being moved along the optical axis for varying focal length of the zoom lens system as a whole, and deviation of the image position caused by moving said second lens group being compensated by moving said second lens group being compensated by moving said first lens group along the optical axis, said zoom lens system having the following numerical data:

| f = 67~194, F 4 | | | |
|---|---|---|---|
| $r_1 =$ | 521.929 | | |
| | $d_1 = 4.6$ | $n_1 = 1.48749$ | $\nu_1 = 70.2$ |
| $r_2 =$ | $-148.682$ | | |
| | $d_2 = 0.12$ | | |
| $r_3 =$ | 74.46 | | |
| | $d_3 = 6.7$ | $n_2 = 1.48749$ | $\nu_2 = 70.2$ |
| $r_4 =$ | $-142.408$ | | |
| | $d_4 = 2.45$ | $n_3 = 1.78472$ | $\nu_3 = 25.7$ |
| $r_5 =$ | $-1072.34$ | | |
| | $d_5 = l_1$ | | |
| $r_6 =$ | $-1038.913$ | | |
| | $d_6 = 4.2$ | $n_4 = 1.78472$ | $\nu_4 = 25.7$ |
| $r_7 =$ | $-46.05$ | | |
| | $d_7 = 1.44$ | $n_5 = 1.50378$ | $\nu_5 = 66.8$ |
| $r_8 =$ | 37.918 | | |
| | $d_8 = 4.98$ | | |
| $r_9 =$ | $-37.452$ | | |
| | $d_9 = 1.44$ | $n_6 = 1.7432$ | $\nu_6 = 49.3$ |
| $r_{10} =$ | 558.858 | | |
| | $d_{10} = l_2$ | | |
| $r_{11} =$ | 75.737 | | |
| | $d_{11} = 4.3$ | $n_7 = 1.617$ | $\nu_7 = 62.8$ |
| $r_{12} =$ | $-39.819$ | | |
| | $d_{12} = 2.4$ | | |
| $r_{13} =$ | $-35.412$ | | |
| | $d_{13} = 2$ | $n_8 = 1.78472$ | $\nu_8 = 25.7$ |
| $r_{14} =$ | $-88.372$ | | |
| | $d_{14} = 0.5$ | | |
| $r_{15} =$ | 48.024 | | |
| | $d_{15} = 4.98$ | $n_9 = 1.6779$ | $\nu_9 = 55.3$ |
| $r_{16} =$ | 119.043 | | |
| | $d_{16} = 60.027$ | | |
| $r_{17} =$ | $-22.124$ | | |
| | $d_{17} = 2.21$ | $n_{10} = 1.744$ | $\nu_{10} = 44.7$ |
| $r_{18} =$ | $-30.941$ | | |
| | $d_{18} = 0.15$ | | |
| $r_{19} =$ | 63.309 | | |
| | $d_{19} = 6.4$ | $n_{11} = 1.62012$ | $\nu_{11} = 49.7$ |
| $r_{20} =$ | $-394.827$ | | |

| f | $l_1$ | $l_2$ |
|---|---|---|
| 67 | 1.7124 | 39.996 |
| 114 | 25.239 | 26.175 |
| 194 | 39.059 | 2.649 |
| $L_{min} = 150.605$, $L_{max} = 160.311$ | | |
| $f_1 = 106$, $f_2 = -33.5$, $f_3 = 56$ | | | wherein the reference symbols $r_1$ through $r_{20}$ represent radii of curvature on the surfaces of the respective lens elements, the reference symbols $d_1$ through $d_{19}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abee's numbers of the respective lens elements, the reference symbols $L_{min}$ and $L_{max}$ designate minimum and maximum total lengths respectively of the lens system as a whole, the reference symbol f denotes focal length of the lens system as a whole, and the reference symbols $f_1$, $f_2$ and $f_3$ represent focal lengths of said first, second and third lens groups respectively.

9. A zoom lens system comprising a first lens group having positive power and consisting of a positive lens component and a cemented doublet composed of a positive lens element and a negative lens element, a second lens group having negative refractive power and consisting of a cemented doublet composed of a positive lens element and a negative lens element and a negative lens component, and a third lens group having positive refractive power and consisting of a positive lens component, a negative lens component, another positive lens component, another negative lens component, and a third positive lens component, said third lens groups being fixed relative to the image plane, said second lens group being moved along the optical axis for varying focal length of the zoom lens system as a whole, and deviation of the image position caused by moving said second lens group being compensated by moving said first lens group along the optical axis, said zoom lens system having the following numerical data:

| f = 67~194, F 4 | | | |
|---|---|---|---|
| $r_1 =$ | 99.76 | | |
| | $d_1 = 6.5$ | $n_1 = 1.48749$ | $\nu_1 = 70.2$ |
| $r_2 =$ | $-172.313$ | | |
| | $d_2 = 0.12$ | | |
| $r_3 =$ | 109.056 | | |
| | $d_3 = 7.5$ | $n_2 = 1.50048$ | $\nu_2 = 66$ |
| $r_4 =$ | $-111.769$ | | |
| | $d_4 = 2$ | $n_3 = 1.7495$ | $\nu_3 = 35.3$ |
| $r_5 =$ | 483.543 | | |
| | $d_5 = l_1$ | | |
| $r_6 =$ | $-844.744$ | | |
| | $d_6 = 5$ | $n_4 = 1.78472$ | $\nu_4 = 25.7$ |
| $r_7 =$ | $-41.023$ | | |
| | $d_7 = 1.5$ | $n_5 = 1.5263$ | $\nu_5 = 51.2$ |
| $r_8 =$ | 36.139 | | |
| | $d_8 = 5.2$ | | |
| $r_9 =$ | $-31.94$ | | |
| | $d_9 = 1.5$ | $n_6 = 1.58904$ | $\nu_6 = 53.2$ |
| $r_{10} =$ | 3814.64 | | |
| | $d_{10} = l_2$ | | |
| $r_{11} =$ | 52.326 | | |
| | $d_{11} = 5.5$ | $n_7 = 1.61117$ | $\nu_7 = 55.9$ |
| $r_{12} =$ | $-37.502$ | | |
| | $d_{12} = 2.4$ | | |
| $r_{13} =$ | $-32.724$ | | |
| | $d_{13} = 2$ | $n_8 = 1.78472$ | $\nu_8 = 25.7$ |
| $r_{14} =$ | $-110.328$ | | |
| | $d_{14} = 0.37$ | | |
| $r_{15} =$ | 47.639 | | |
| | $d_{15} = 4.98$ | $n_9 = 1.5263$ | $\nu_9 = 51.2$ |
| $r_{16} =$ | 154.948 | | |
| | $d_{16} = 53.84$ | | |
| $r_{17} =$ | $-20.709$ | | |
| | $d_{17} = 2.21$ | $n_{10} = 1.757$ | $\nu_{10} = 47.9$ |
| $r_{18} =$ | $-27.67$ | | |
| | $d_{18} = 0.15$ | | |
| $r_{19} =$ | 59.052 | | |
| | $d_{19} = 5.5$ | $n_{11} = 1.62374$ | $\nu_{11} = 47.1$ |
| $r_{20} =$ | $-2279.574$ | | |

| f | $l_1$ | $l_2$ |
|---|---|---|
| 67 | 2.28 | 40.93 |
| 114 | 26.86 | 26.49 |
| 194 | 41.299 | 1.912 |
| $L_{min} = 149.48$, $L_{max} = 159.62$ | | |
| $f_1 = 115$, $f_2 = -35$, $f_3 = 56$ | | | wherein the reference symbols $r_1$ through $r_{20}$ represent radii of curvature on the surfaces of the respective lens elements, the reference symbols $d_1$ through $d_{19}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbols $L_{min}$ and $L_{max}$ designate minimum and maximum total lengths respectively of the lens system as a whole, the reference symbol f denotes focal length of the lens system as a whole, and the reference symbols $f_1$, $f_2$ and $f_3$ represent focal lengths of said first, second and third lens groups respectively.

* * * * *